July 17, 1923.
F. BONNET
MOLDING APPARATUS FOR COMPRESSED BLOCKS
Filed Feb. 9, 1920
1,461,860
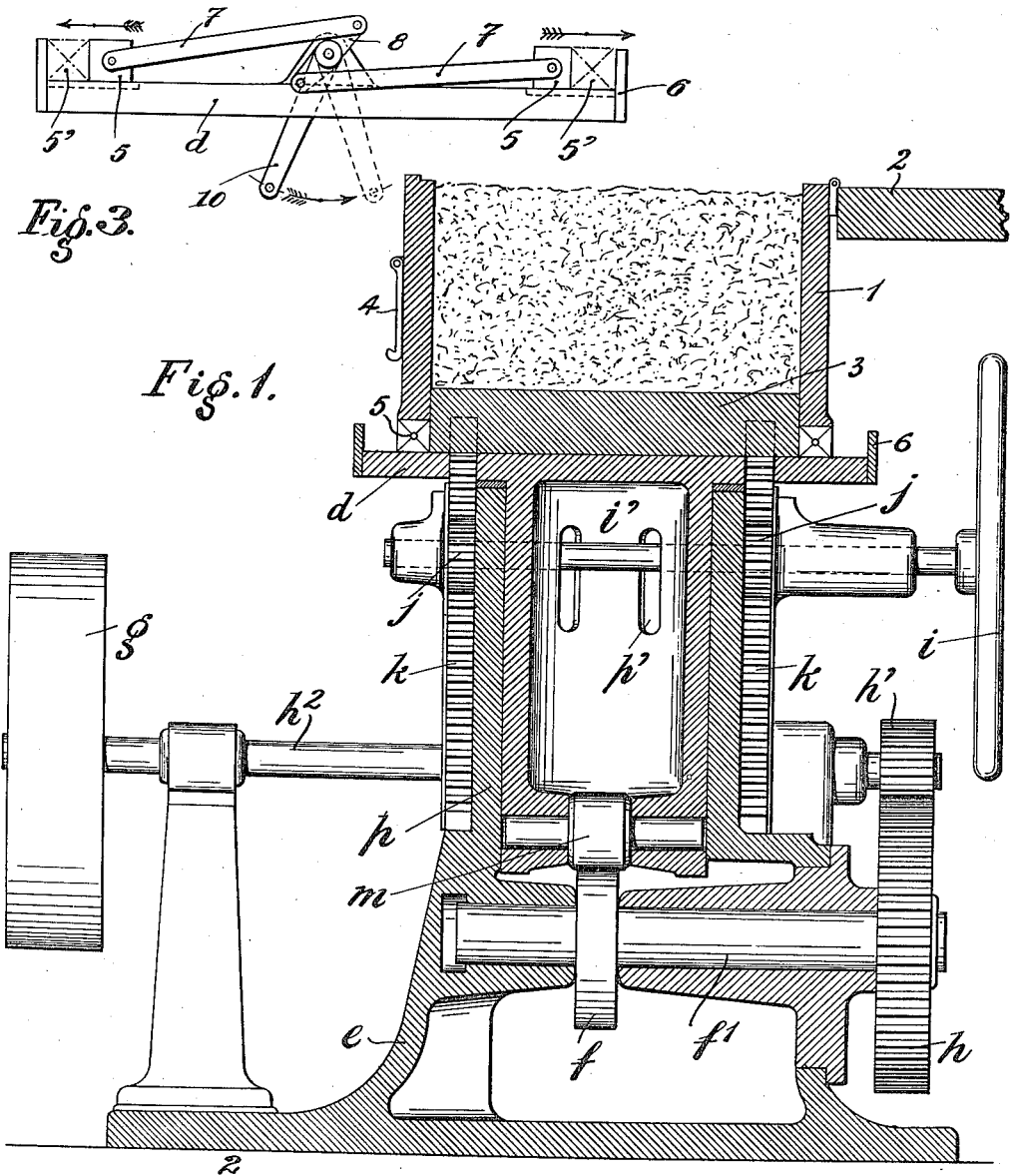
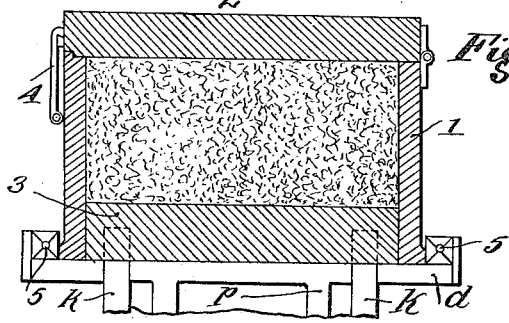
Inventor:
François Bonnet
By
Attorney.

Patented July 17, 1923.

1,461,860

UNITED STATES PATENT OFFICE.

FRANÇOIS BONNET, OF VILLEFRANCHE-SUR-SAONE, FRANCE.

MOLDING APPARATUS FOR COMPRESSED BLOCKS.

Application filed February 9, 1920. Serial No. 357,129.

*To all whom it may concern:*

Be it known that I, FRANÇOIS BONNET, a citizen of the French Republic, of Villefranche-sur-Saone, France, have invented certain new and useful Improvements in Molding Apparatus for Compressed Blocks, of which the following is a specification.

The invention relates to improvements in molding apparatus for compressed blocks, which is especially applicable to the molding of agglomerated or other materials, the compression of which is obtained by the settling of said materials inside the mould, under the effect of repeated shocks to which the mould is subjected.

The mould is connected, by its frame, with a piston, and the materials to be moulded filling said frame rest on a movable base, the latter being raised by ratchets when the settling or ramming is finished and the moulded block is then ejected at the top of the mould which remains fixed during this ejection.

The annexed drawing illustrates an example of construction of the invention.

Figs. 1 and 2 show in vertical section the mould in its two extreme positions. In Fig. 1 it is represented when the filling operation is completed; in Fig. 2 the mould has completed its descent and the moulded block is at its maximum compression.

Fig. 3 illustrates mechanism of controlling the supports sustaining the mould during the filling stage.

In order that the mould device may be clearly distinguished from the shock producing mechanism effecting the ramming of the material to be moulded, the parts of the mould device are indicated by reference numerals, whilst the members of the ramming mechanism are indicated by reference letters.

The upper ends of ratchets $k$ which pass through the table $d$ surmounting the piston $p$ are secured to a base 3 of great thickness and fitting into the interior space of the mould 1, 2.

This mould is composed of walls 1 and a cover 2 hinged so that it can be opened and closed. It is quite free and encloses the base 3 so that it can slide vertically thereon according as to whether the material is to be compressed or the mould is to be raised after forming and ejecting a moulded block.

The molding device is therefore used in a way the reverse of that usually employed, and serves on the one hand to give the material the required shape and size, whilst effecting the gradual compression of said material during the settling operation and ensures the compression of the top layer of material by acting on this layer through the cover 2 under the effect of the weight of the mould.

For loading the material the cover 2 is opened, Fig. 1, and the walls of the mould rest on the table $d$ by means of two supports 5 symmetrically arranged on two sides of the movable base 3. The height of these supports is in accordance with the degree of compression which the material is to receive.

When this material reaches the top edges of the walls 1, Fig. 1, the cover 2 is closed and locked by a bolt such as 4. Then the supports 5 are moved apart laterally so as to move away from under the walls 1. At that moment the operator engages the mechanism controlling the piston $p$ which is raised by a cam $f$ keyed on the shaft $f^1$ driven by the gear wheel $h$ through the pinion $h^1$ mounted on the end of the shaft $h^2$ the latter being driven by the pulley $g$. The pinion drops suddenly back when the boss of said cam escapes from under a roller $m$ mounted in the base of the piston and by which the piston rests on the cam.

Owing to the sudden shocks given to the piston and of the whole matter which it supports (base 3, material to be moulded and mould 1, 2) by the cam, the material is gradually rammed and the mould descends as the thickness of the block in formation decreases. When the lower edges of said mould reach the top surface of the table $d$ and rest thereon, the operator stops the piston and consequently the ramming operation, as the compression of the block is completed.

At this moment the operator opens the cover 2 to the position of Fig. 1, then he works the hand-wheel $i$ in the suitable direction for producing the lifting of the two ratchets $k$ through shaft $i^1$ and cog wheels $j$, and consequently the base 3 is lifted and the moulded block supported by the latter. The sides of said base and of the block slide then along the walls 1 of the mould, as the latter remains immovable during the said ascent, seeing that its weight keeps it applied to the table *d* and creates a resistance preventing the ascent of the block and of its support 3 from causing any displacement of said mould.

When the base of the moulded block has passed beyond the top edges of the walls of the mould, the hand-wheel *i* is no longer worked and the block is removed, then the said fly-wheel *i* is again rotated but in a direction contrary to the former and until the base 3 comes to rest on the table *d*. The mould is then raised by hand by the operator to a sufficient extent to allow the supports 5 to be brought nearer each other and come into the position shown in Fig. 1, so as to serve as wedge to the mould and keep it lifted above the table *d* in order to allow the mould to be refilled. The same operations as above described are recommended for obtaining a second moulded block, and so on, as desired, for the manufacture of blocks of like dimensions.

When the dimensions are to be altered, the base 3 and the mould 1, 2, are replaced by other elements of like arrangement but of different dimensions.

The shifting of the supports 5 can be effected by hand and consecutively, but it is preferable and more practical to control them simultaneously by some suitable mechanism. Fig. 3 shows by way of example a simple controlling means: it consists in two similar levers 7 articulated on a rod passing longitudinally through each support and projecting through the end thereof, and to a connecting-rod 8 rocking at 9 on a fixed axle integral with the table *d*. To the connecting-rod 8 is secured a starting lever 10 provided with a handle in order to be actuated by hand. This control device can be arranged only on one side of the supports, or on both sides, in the latter case the two levers 10 would be connected by a rod in order to be simultaneously controlled.

The full lines in Fig. 3 represent the position of the levers and connecting-rod when the supports are in place for supporting the mould and lifting it above the table *d*. The arrow indicates the direction in which the lever 10 is actuated in order to produce the rocking movement of the connecting-rod 8 which causes the displacement in the contrary direction of the levers 7 and the sliding of the supports which assume the position shown by the dotted lines in Fig. 3, where they stop against tappets 6 adjusted against the corresponding sides of the table *d*. The supports may have tongue-pieces which engage in grooves provided in the table in order to ensure a rectilinear sliding of the supports.

What I claim as my invention and desire to secure by Letters Patent of the United States is:—

1. A machine for molding concrete or the like blocks comprising a table, a mould thereon, movable vertically with respect thereto, a base fitting within said mould, a lid for said mould, means for imparting short reciprocating vertical movements to said base within said mould to compress the substance being moulded, means for imparting continuous vertical movement to said base, members seated beneath the lateral walls of the mould and said table and means for sliding said members from beneath said mould to allow said mould to sink toward said table and compress the substance being moulded.

2. A machine as in claim 1, wherein the means for effecting the continuous vertical movement of the base comprises ratchets fixed to said base and operated by cog wheels mounted on a shaft actuated by means of a hand wheel.

3. A mould as in claim 1, wherein the means for imparting the reciprocating movement to said base comprises a piston actuated by a cam mounted on a driving shaft.

4. A mould as in claim 1, wherein the sliding members beneath the walls of the mould comprise blocks actuated simultaneously by means of levers and links actuated by a hand lever.

In witness whereof I have signed this specification in the presence of two witnesses.

FRANÇOIS BONNET.

Witnesses:
GASTON JEANNIAUX,
MARIN VACHON.